June 7, 1938.　　　R. H. TULL　　　2,119,800
TELESCOPING EXTENSION FOR TRUCKS AND TRAILERS
Filed May 17, 1937
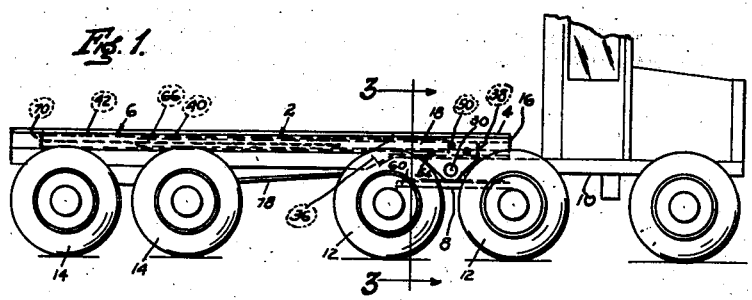
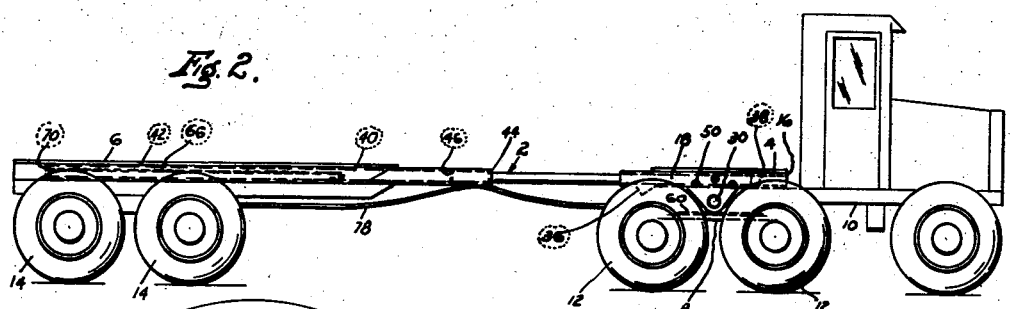
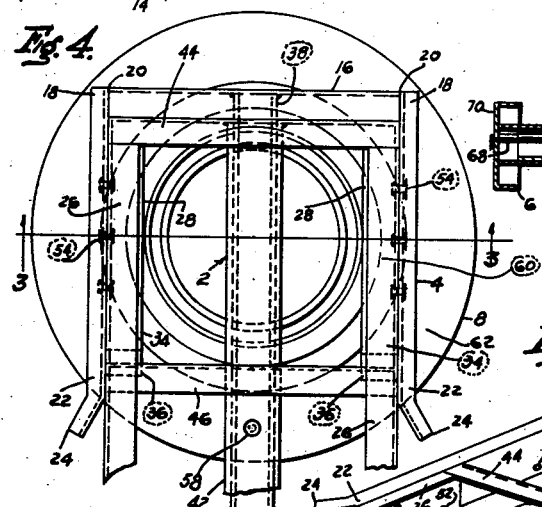
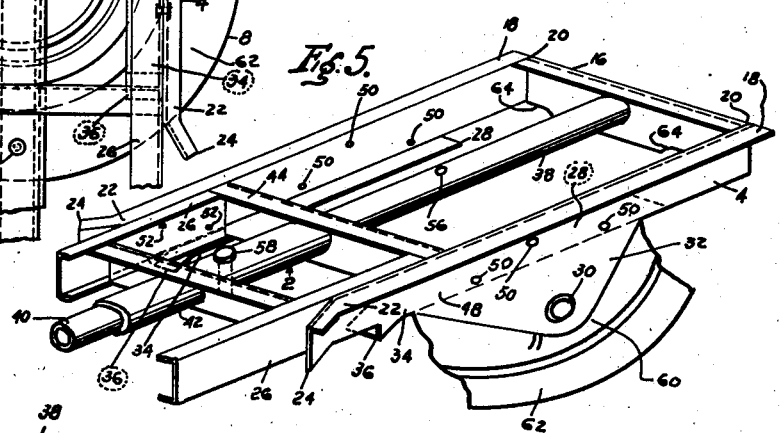
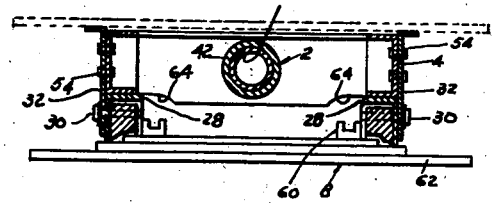
INVENTOR
Roy H. Tull Patented June 7, 1938

2,119,800

UNITED STATES PATENT OFFICE 2,119,800

TELESCOPING EXTENSION FOR TRUCKS AND TRAILERS

Roy H. Tull, Long Beach, Calif.

Application May 17, 1937, Serial No. 143,149

2 Claims. (Cl. 280—106)

My invention relates to the telescoping extension for vehicles such as trucks or trailers, and more particularly to devices which are adapted for extending the rear frame section of the vehicle in order to take care of the diversified lengths of the transporting ware such as I-beams, pipes or other merchandise as in practice may be necessary to transport, so that, while driving an empty vehicle it may be contracted to form a short truck or vehicle, whereby it will eliminate, for the time being, the extension trailer and therefore not only provide a safety to the driver because of the trailer and the truck combination, but also, providing considerable saving in fuel consumption of the motor vehicle.

Accordingly, an object of my invention is to provide a suitable mechanism for extending the rear frame section of the vehicle, which is simple in construction and easy to operate, and which will enable the operator of said vehicle to drive it in more compact form when empty and only when carrying a load to have it extended.

Further object of my invention is to provide a suitable extension mechanism for the vehicle which when in use will hold the rear end section of said vehicle in position and in respect to the front end, the driving member thereof, and which, when extended to any desired length, it will carry the load evenly distributed between the said front and rear load supporting members.

Another object of my invention is to provide a suitable mechanism for the vehicle, with which to shorten or lengthen the respective positions of the front and the rear load carrying members of the vehicle, which when in operation will provide safety for the driver particularly when making sharp turns on the highway and also to prevent the pulling of the useless dead weight which heretofore has been unavoidable.

Another object of my invention is to provide the front frame section of the vehicle with suitable means to receive and hold therein the front end section of the rear frame member, also having suitable locking means provided therein for fastening said members together and thus rendering it safe while driving the vehicle empty or when carrying the load.

Other objects and advantages of my invention as will hereinafter more fully appear, I attain by the construction herein shown on the drawing and described in the specification, forming a part of my application.

Reference is had to the accompanying drawing in which the similar reference characters denote the similar parts.

In the drawing:—

Fig. 1 is the side elevational view of the truck, showing the telescoping device in closed position.

Fig. 2 is the side elevational view of the truck, showing the telescoping device in extended position, forming a combine trailer.

Fig. 3 shows the transverse cross-sectional view of the telescoping device, showing the respective position of the frame sections.

Fig. 4 is the top view of the device, taken from Fig. 3.

Fig. 5 shows the fragmentary perspective view of the device showing the position of the guides, frame section, the telescoping tube and the locking means for holding it in place.

Fig. 6 shows the longitudinal cross-sectional view of the safety latch or locking means associated with the telescoping device.

Describing my invention more in detail, said invention comprises a telescoping device, generally designated by numeral 2, which is composed of the front section member 4 and the rear section frame 6.

Said front section member 4 is mounted upon the swivel section member 8 of the vehicle 10, and is located in a suitable position in relation to the driving wheel 12 in order to distribute the load properly between the front section 4 and the rear section 6, and when in contracted or in extended position, as in practice may be desirable.

The rear frame section 6 is also located suitably in relation to the supporting wheels 14, so that, when the load is placed thereon, it is so positioned thereover, whereby said telescoping device 2 may not and should not be hampered thereby.

In order to facilitate the telescoping device 2, the said front section member 4 is provided with a front cross bar 16 which is equipped at its ends with frame side guiding members 18, one at each side, of which the front ends 20 are permanently secured thereto while the rear ends 22 are deflected sidewardly as at 24 thus providing the guiding means for the end section 26 of the said rear frame section 6.

For the purpose to support and hold in place the said end section 26 of the said rear frame section 6, said guiding members 18 are provided with suitable side support members 28 which are positioned in parallel to the top of said guiding members 18 and above the fulcrum 30 of the fulcrum plate 32, and the entrance ends 34 are provided with suitable lip members 36, extending downwardly, as shown, the purpose of which will be presently described.

The said cross bar 16 is provided at its center with suitable plunger 38, which may be of any desired structure preferably however of tubular cross-section, said plunger 38 may be attached thereto in any manner most adaptable in practice having its end 40 extending rearwardly of the front section member 4 and slidably positioned within a suitable sleeve member 42 secured to the rear frame section 6 by means of suitable sleeve member cross bars 44 and 46.

For the purpose to lock said rear frame section 6 within said guiding members 18 of the said front section 4, the said fulcrum plate 32 at its upper section 48 is provided with suitable holes 50 which are positioned in line and in relation to the respective holes 52 of the said end section 26 and wherein suitable bolts 54 may be placed in order to hold said section together, also, for the purpose to safeguard the position of the said plunger 38 within the said sleeve member 42, suitable holes 56 at intervals are positioned, adapted to receive therein the locking bolt 58 as shown.

Obviously it may be noted, that when in operation, the adjustment of the said telescoping device 2 may be made while the front section member 4 and the rear frame member 6 is or may be in any position in respect to each other, and in order to prevent the tilting track 60 of the swivel plate 62 from contacting the cross bar 44 of the end section 26, while at angular position, suitable undercut clearances 64 are provided therein at each end thereof, also in order to provide a safety feature and to prevent the disengagement of the telescoping device 2 in case of accident then for that purpose a suitable longitudinal safety hook rod member 66 or the like is provided therein, of which the eyelet 68 is attached to the rear end 70 of the said sleeve member 42 while the hook 72 extends internally of said plunger 38 having a cross rod 74 at the end 76 adapted to engage it, consequently preventing its disengagement, however care must be taken in providing sufficient length of the air brake hose 78 to correspond to the most extreme extension of the said telescoping device 2 or while engaged by the said safety hook rod member 66, and thus preventing an accident.

Further, it may be noted that the above described telescoping device may be composed of a plurality of elements in order to insure the strength of the frame and while the vehicle is subjected to heavy loads and strain.

While I have thus described by invention with great particularity, it will be clear that the same may be modified throughout a wide range.

I accordingly do not propose to be limited to the exact details of construction herein shown and described but reserve the right in practice to make necessary changes and modifications which may come within the scope of the appended claims.

I claim as my invention:—

1. In the apparatus of the class described adapted for the use in a truck vehicle and for extending the length of a vehicle frame comprising the front section member and the rear frame section of said vehicle, means connected to said front and rear section of said vehicle frame and slidably associated with each other for extending and holding the respective front section and the rear frame section at a desired distance, an eyelet member having a hooked end, the end of which is connected to the frame of the said rear frame section and extending frontwardly within said slidably engaging means, and a cross rod member transversely positioned within said slidably engaging means of the said front section adapted to engage and hold the said hooked end of the said eyelet member, to prevent the disengagement of the said slidably engaging means of the front and the rear sections of the vehicle, and to provide a safety hold for said rear frame section of the said vehicle, when in extended position.

2. In the telescoping device of the class described adapted to be used for extending the vehicle frame, said frame consisting of, a front section member and a rear frame section, said front section member comprising, a cross bar, a pair of side guides connected to said cross bar, a pair of side supports connected to said pair of side guides for guiding and holding the end of said rear frame section into place, a plunger means connected to said front section member cross bar, a sleeve means connected to the said rear frame section slidably associated with said plunger means for extending the respective positions of said frame section of said vehicle, and a safety locking means connected to said plunger and sleeve means for locking same in place, when in extended position, to prevent its disengagement.

ROY H. TULL.